(12) United States Patent
Hulse

(10) Patent No.: US 7,229,196 B2
(45) Date of Patent: Jun. 12, 2007

(54) ILLUMINATION DEVICE FOR SIMULATING NEON OR SIMILAR LIGHTING IN THE SHAPE OF A TOROID

(75) Inventor: George R. Hulse, Arlington Heights, IL (US)

(73) Assignee: iLight Technologies, Inc., Chicago, IL (US)

( * ) Notice: Subject to any disclaimer, the term of this patent is extended or adjusted under 35 U.S.C. 154(b) by 0 days.

(21) Appl. No.: 11/421,502

(22) Filed: Jun. 1, 2006

(65) Prior Publication Data

US 2007/0001613 A1   Jan. 4, 2007

Related U.S. Application Data

(60) Provisional application No. 60/689,640, filed on Jun. 10, 2005.

(51) Int. Cl.
*F21V 7/00* (2006.01)
(52) U.S. Cl. .................. 362/341; 362/26; 362/293; 362/311; 362/334; 362/555; 362/565; 362/800
(58) Field of Classification Search ............. 362/311, 362/334, 341, 565, 800, 26, 293, 555
See application file for complete search history.

(56) References Cited

U.S. PATENT DOCUMENTS 5,762,414 A * 6/1998 Montalan et al. ........... 362/503

| | | | |
|---|---|---|---|
| 6,193,399 B1 | 2/2001 | Hulse | |
| 6,234,439 B1 | 5/2001 | Townsend et al. | |
| 6,419,379 B1 | 7/2002 | Hulse | |
| 6,641,276 B1 * | 11/2003 | Macher et al. | 362/84 |
| 6,988,815 B1 * | 1/2006 | Rizkin et al. | 362/245 |

\* cited by examiner

*Primary Examiner*—Stephen F. Husar
*Assistant Examiner*—Meghan K. Dunwiddie
(74) *Attorney, Agent, or Firm*—Stites & Harbison, PLLC; Jeffrey A. Haeberlin; David W. Nagle, Jr.

(57) ABSTRACT

An illumination device has a light-transmitting member formed in the shape of a toroid having a light-receiving surface and a light-emitting surface, the light-transmitting member defining a central axis, a light source located along the light-transmitting member central axis, and a light-directing housing for guiding light from the light source into the light-receiving surface of the light-transmitting member. The light-transmitting member may have optical waveguide and light-scattering characteristics, whereby the light-transmitting member emits light having a substantially uniform intensity along the light-emitting surface. The light-directing housing has a top reflector member and a bottom reflector member positioned on opposing side of the light source and cooperating with the light-transmitting member such that light is emitted only through the light-transmitting member.

15 Claims, 6 Drawing Sheets

ID OR SIMILAR LIGHTING IN THE
ILLUMINATION DEVICE FOR SIMULATING NEON OR SIMILAR LIGHTING IN THE SHAPE OF A TOROID

CROSS-REFERENCE TO RELATED APPLICATIONS

The present application claims priority to U.S. Provisional Patent Application Ser. No. 60/689,640 filed on Jun. 10, 2005, the entire disclosure of which is incorporated herein by reference.

BACKGROUND OF THE INVENTION

The present invention is an illumination device for simulating neon or similar lighting in the shape of a toroid.

Neon lighting is produced by the electrical stimulation of the electrons in the low-pressure neon gas-filled glass tube. A characteristic of neon lighting is that the tubing encompassing the gas has an even glow over its entire length irrespective of the viewing angle. This characteristic makes neon lighting adaptable for many applications because the glass tubing can be fabricated into curved and twisted configurations. The even glow of neon lighting is typically devoid of hot spots. Thus, an illumination device that is developed to duplicate the effects of neon lighting must also have even light distribution over its length and about its circumference. Equally important, such lighting devices must have a brightness that is at least comparable to neon lighting. Further, since neon lighting is a well-established industry, a competitive lighting device must be lightweight and have superior "handleability" characteristics in order to make inroads into the neon lighting market. Neon lighting is recognized as being fragile in nature. Because of the fragility and heavy weight, primarily due to its supporting infrastructure, neon lighting is expensive to package and ship. Moreover, it is extremely awkward to initially handle, install, and/or replace. Any lighting device that can provide those previously enumerated positive characteristics of neon lighting, while minimizing its size, weight, and handleability shortcomings, will provide for a significant advance in the lighting technology.

The recent introduction of lightweight and breakage resistant point light sources, as exemplified by high-intensity light-emitting diodes (LEDs), have shown great promise to those interested in illumination devices that may simulate neon or similar lighting and have stimulated much effort in that direction. However, the twin attributes of neon lighting, uniformity and brightness, have proven to be difficult obstacles to overcome as such attempts to simulate neon lighting have largely been stymied by the tradeoffs between uniformity and brightness.

In an attempt to address some of the shortcomings of neon, commonly assigned U.S. Pat. No. 6,592,238, which is incorporated in its entirety herein by reference, describes an illumination device comprising a profiled rod of material having waveguide properties that preferentially scatters light entering one surface ("light-receiving surface") so that the resulting light intensity pattern emitted by another surface of the rod ("light-emitting surface") is elongated along the length of the rod. A light source extends along and is positioned adjacent the light-receiving surface and spaced from the light-emitting surface a distance sufficient to create an elongated light intensity pattern with a major axis along the length of the rod and a minor axis that has a width that covers substantially the entire circumferential width of the light-emitting surface. In a preferred arrangement, the light source is a string of point light sources spaced a distance apart sufficient to permit the mapping of the light emitted by each point light source into the rod so as to create elongated and overlapping light intensity patterns along the light-emitting surface and circumferentially about the surface so that the collective light intensity pattern is perceived as being uniform over the entire light-emitting surface.

One of the essential features of the illumination device described and claimed in U.S. Pat. No. 6,592,238 is the uniformity and intensity of the light emitted by the illumination device. While it is important that the disadvantages of neon lighting be avoided (for example, weight and fragility), an illumination device would have little commercial or practical value if the proper light uniformity and intensity could not be obtained. This objective is achieved primarily through the use of a "leaky" waveguide rod. A "leaky" waveguide is structural member that functions both as an optical waveguide and light scattering member. As a waveguide, it tends to preferentially direct light entering the waveguide, including the light entering a surface thereof, along the axial direction of the waveguide, while as a light scattering member, it urges the light out of an opposite surface of the waveguide. As a result, what is visually perceived is an elongated light pattern being emitted along the light-emitting surface of the waveguide.

However, it would be desirable to construct an illumination device that that provides a substantially uniform light intensity pattern in a manner similar to that described above with respect to U.S. Pat. No. 6,592,238, but with a physical structure that allows a single light source to be used in the construction.

Such a device would preferably have the characteristics of being low profile, low power, durable, and lightweight, and usable as decorative (i.e. hanging on walls or ceilings) or task (i.e. desk lamps) lighting. Further, it is desirable that such an illumination device have a toroidal light-emitting surface, for both decorative and practical reasons, as toroidal or circular light-emitting surfaces tend to reduce shadows and evenly illuminate objects. Thus, there is a need for an illumination device for simulating neon or similar lighting having a toroidal construction.

BRIEF SUMMARY OF THE INVENTION

These needs, and others, are met by the illumination device of the invention.

Generally described, an illumination device according to the invention has a light-transmitting member formed in the shape of a toroid having a light-receiving surface and a light-emitting surface, the light-transmitting member defining a central axis, a light source located along the light-transmitting member central axis, and a light-directing housing for guiding light from the light source into the light-receiving surface of the light-transmitting member.

According to one aspect of the invention, the light-transmitting member has optical waveguide and light-scattering characteristics, or is a "leaky" waveguide, whereby the light-transmitting member emits light having a substantially uniform intensity along the light-emitting surface. The light source may either be located within the opening defined by the toroidal light-transmitting member, or may be spaced a distance from the opening. Further, the light-directing housing may have a top reflector member and a bottom reflector member positioned on opposing side of the light source and cooperating with the light-transmitting member such that light is emitted only through the light-transmitting member. The top reflector member and bottom reflector member may have various configurations for guiding light to the light-receiving surface of the light-transmitting member.

DETAILED DESCRIPTION OF INVENTION

The present invention is an illumination device for simulating neon or similar lighting in the shape of a toroid. As commonly understood and used herein, a toroid is a surface generated by a closed curve rotating about, but not intersecting or containing, an axis in its own plane, or a solid having such a surface. As described above, an illumination device having a toroidal or semi-toroidal light-emitting surface that simulates the uniform intensity and brightness of neon lighting is desired. The present invention provides such an illumination device with the additional benefit of using a single light source.

Figure 1:
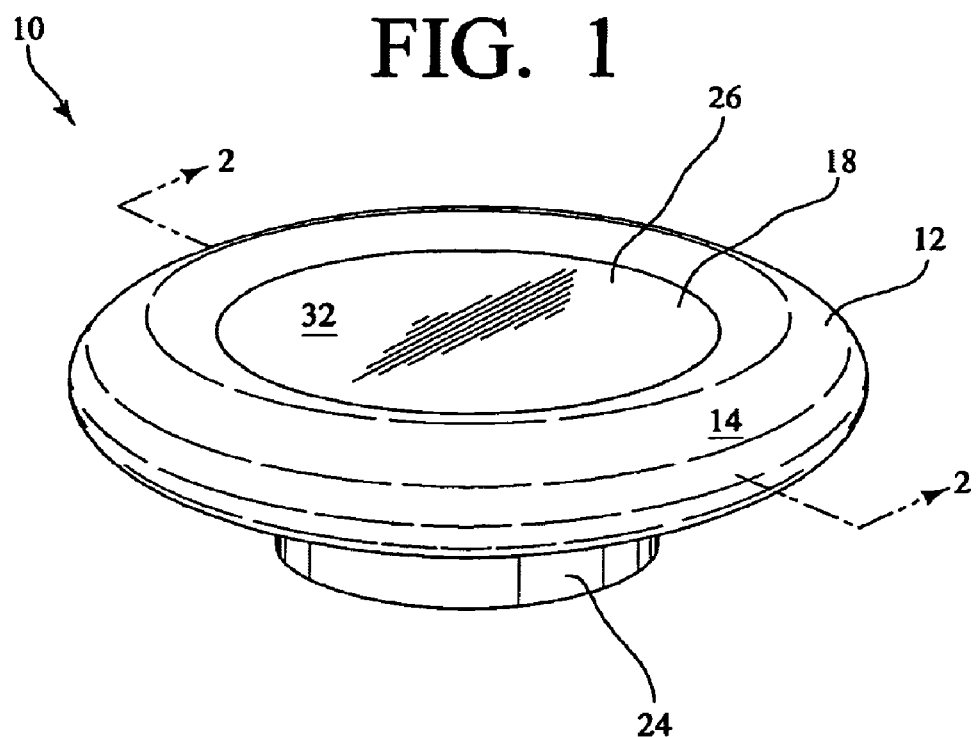
FIG. 1 is a perspective view of an exemplary embodiment of an illumination device for simulating neon or similar lighting having a toroidal construction.

FIG. 1 is a perspective view of an exemplary embodiment 10 of just such an illumination device having a light-transmitting member 12 formed of a light-transmitting medium in the shape of a toroid. The light-transmitting member 12 has a light-emitting surface 14. In use, the light-transmitting member 12 emits light having a substantially uniform intensity or brightness along the light-emitting surface 14, simulating neon or similar lighting in the shape of a toroid.

Figure 2:
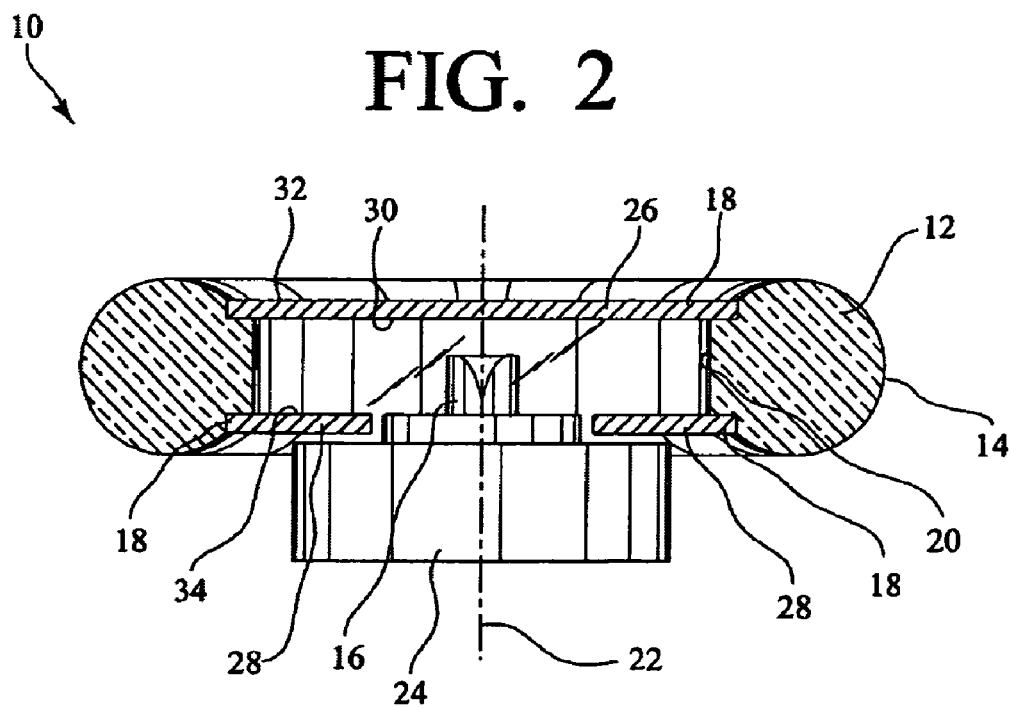
FIG. 2 is a side sectional view of the illumination device of FIG. 1.

FIG. 2 is a side sectional view of the illumination device 10 of FIG. 1 in more detail. As shown, the exemplary illumination device 10 has the toroidal light-transmitting member 14, a light source 16, and a light-directing housing 18.

The light-transmitting member 12, as mentioned, is formed of a light-transmitting medium in the shape of a toroid, and has a light-receiving surface 20 and a light-emitting surface 14. The toroidal light-transmitting member 12 therefore defines a central axis 22 about which the closed curve which comprises the light-receiving surface 20 and light-emitting surface 14 is rotated to form the toroidal shape. The light-transmitting member 12 is a "leaky" waveguide, having both optical waveguide and light scattering characteristics. Having optical waveguide characteristics, the light-transmitting member 12 tends to preferentially direct light entering the light-receiving surface 20 along the axial direction (which, being toroidal, is circular), while the light-scattering characteristics urge light out of the light-emitting surface 14. Light entering the light-receiving surface 20 of the light-transmitting member 12 is directed along at least a portion of the light-transmitting member 12 before being emitted from the light-emitting surface 14. As a result, the light-transmitting member 12 emits light entering the light-receiving surface 20 along the light-emitting surface 14 with a uniformity and brightness that is characteristic of neon or similar lighting. The characteristics of such a "leaky" waveguide are further described in U.S. Pat. No. 6,592,238, as mentioned above. A preferred material exhibiting such "leaky" waveguide characteristics is a frosted acrylic material, such as Frosted DR 66080 Acrylic produced by Arkema Inc., of Philadelphia, Pa., although other materials with similar characteristics are certainly within the spirit of the teachings and the claims of the invention that follow.

The light source 16 is located along the central axis 22 of the toroidal light-transmitting member 12. Advantageously, the symmetry of the illumination device 10 allows a single lamp to serve as the light source 16. In the exemplary embodiment shown in FIG. 2, the light source 16 is located within the opening defined by the toroidal light-transmitting member 12 for a low-profile configuration. Preferably, the light source 16 is a single, high intensity light-emitting diode (LED). Of course, one of skill in the art will recognize that many other lamps may be utilized with the spirit and scope of the claimed invention. Also shown is a heat-sink 24 member for cooling of such an LED light source 16, however the heat-sink 24 is not necessary for all LEDs, and will possibly become unnecessary for any LEDs as LED technology advances.

The light-directing housing 18 in the illustrated embodiment has a top reflector member 26 and a bottom reflector member 28 for directing light from the light source 16 to the light-receiving surface 20 of the light-transmitting member 12. The top reflector member 26 is disk-shaped and covers a top portion of the opening defined by the toroidal light-transmitting member 12. Preferably, the top reflector member 26 has an interior surface 30 that is substantially reflective, and an outer surface 32 that is substantially non-reflective and/or absorbing. The bottom reflector member 28 is ring-shaped and covers the bottom portion of the opening defined by the toroidal light-transmitting member 12. The light source 16 is received in the opening defined by the ring-shaped bottom reflector member 28. Preferably, the bottom reflector member 28 has an interior surface 34 that is also substantially reflective. Thus, the light-directing housing 18 guides light from the light source 16 into the light-receiving surface 20 of the light-transmitting member 12, such that light is emitted only through the light-transmitting member 12.

Preferably, the light-emitting surface 14 of the light-transmitting member 12 is curved, rounded, or arcuate to aid in the simulated effect of neon or similar lighting, and the light-receiving surface 20 is shaped to optimize collection of light guided thereto by the light-directing housing 18 from the light source 16.

Of course, light sources 16 of various colors and electronics for controlling the light source 16 may be utilized to provide illumination with various colors and lighting effects. As a further refinement, the light-transmitting member 12 may be doped with color changing pigment, such as fluorescent and/or phosphorescent dyes, to alter the color of the emitted light. Furthermore, some form of color conversion system could be incorporated into the illumination device 10 such as those described in commonly assigned U.S. Pat. No. 7,011,421 and in commonly assigned and co-pending U.S. patent application Ser. No. 11/025,019 filed Dec. 29, 2004, each of which is incorporated herein by reference.

Figure 3:
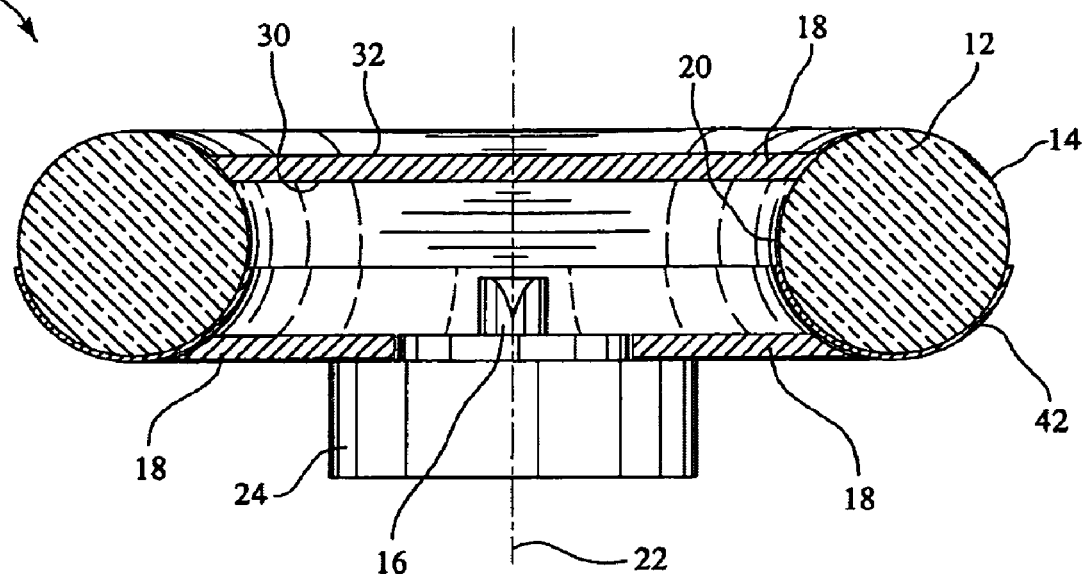
FIG. 3 is a side sectional view of an alternate embodiment of an illumination device for simulating neon or similar lighting having a toroidal construction.

FIG. 3 shows an alternate embodiment 40 of an illumination device for simulating neon or similar lighting in the shape of a toroid. Similar to previously described example, the illumination device 40 has a light-transmitting member 12, a light source 16, and a light-directing housing 18. However, the alternate embodiment of FIG. 3 also includes reflective tape 42 positioned around a lower portion of the light-transmitting member 12. Additionally, the light source 16 shown is a side-emitting LED, although for all of the embodiments described herein, top-emitting, or batwing, and side-emitting LEDs can be utilized.

Figure 4:
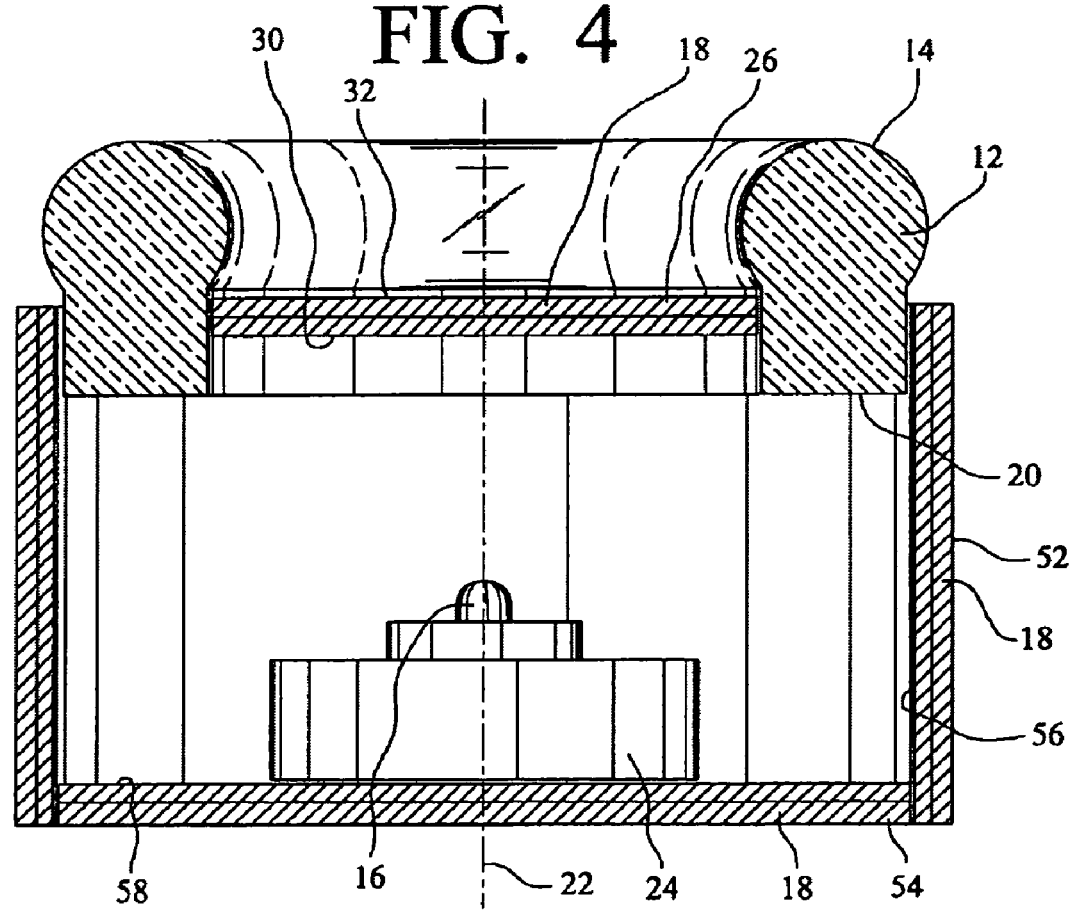
FIG. 4 is a side sectional view of another alternate embodiment of an illumination device for simulating neon or similar lighting having a toroidal construction.

FIG. 4 shows yet another alternate embodiment 50 of an illumination device for simulating neon or similar lighting in the shape of a toroid, having a light-transmitting member 12, a light source 16, and a light-directing housing 18. In this embodiment 50, the light source 16 is a top-emitting LED positioned along the central axis 22 of the toroidal light-transmitting member 12. However, the light source 16 is spaced a distance from the opening defined by the toroidal light-transmitting member 12. The light-directing housing 18 has a disk-shaped top reflector member 26, which has a substantially reflective interior surface 30 and a substantially non-reflective and/or absorbing outer surface 32. The light-directing housing 18 also has a bottom reflector member 28, which includes a cylindrical side wall 52 and a disk-shaped bottom wall 54. The side wall 52 has a substantially reflective interior surface 56, and the bottom wall 54 also has a substantially reflective interior surface 58, for directing light from the light-source 16 into the light-receiving surface 20 of the light-transmitting member 12.

Figure 5:
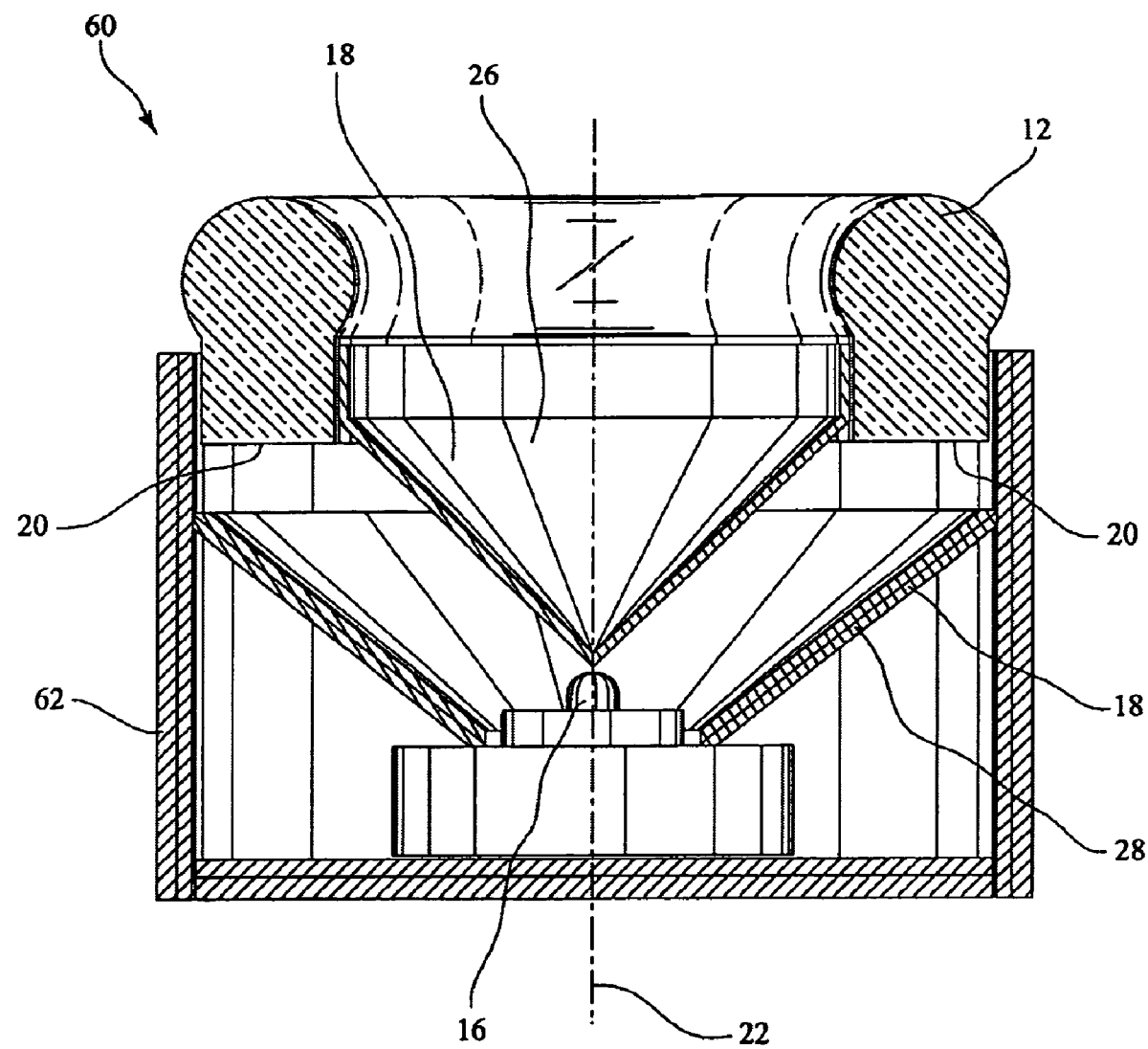
FIG. 5 is a side sectional view of yet another alternate embodiment of an illumination device for simulating neon or similar lighting having a toroidal construction.

FIG. 5 shows yet another alternated embodiment 60 of an illumination device according to the invention. As generally described above, the embodiment 60 has a light-transmitting member 12, a light source 16, and a light-directing housing 18. Further, the light-directing housing 18 includes a top reflector member 26, and a bottom reflector member 28. The top reflective member 26 and the bottom reflective member 28 have a substantially conical shape to direct light from the light source 16 to the light-receiving surface 20 of the light-transmitting member 12. The light source 16 shown in a top-emitting LED. The embodiment 60 may also have a structural housing 62 for positioning the elements of the illumination device in proper orientation with each other.

Figure 6:
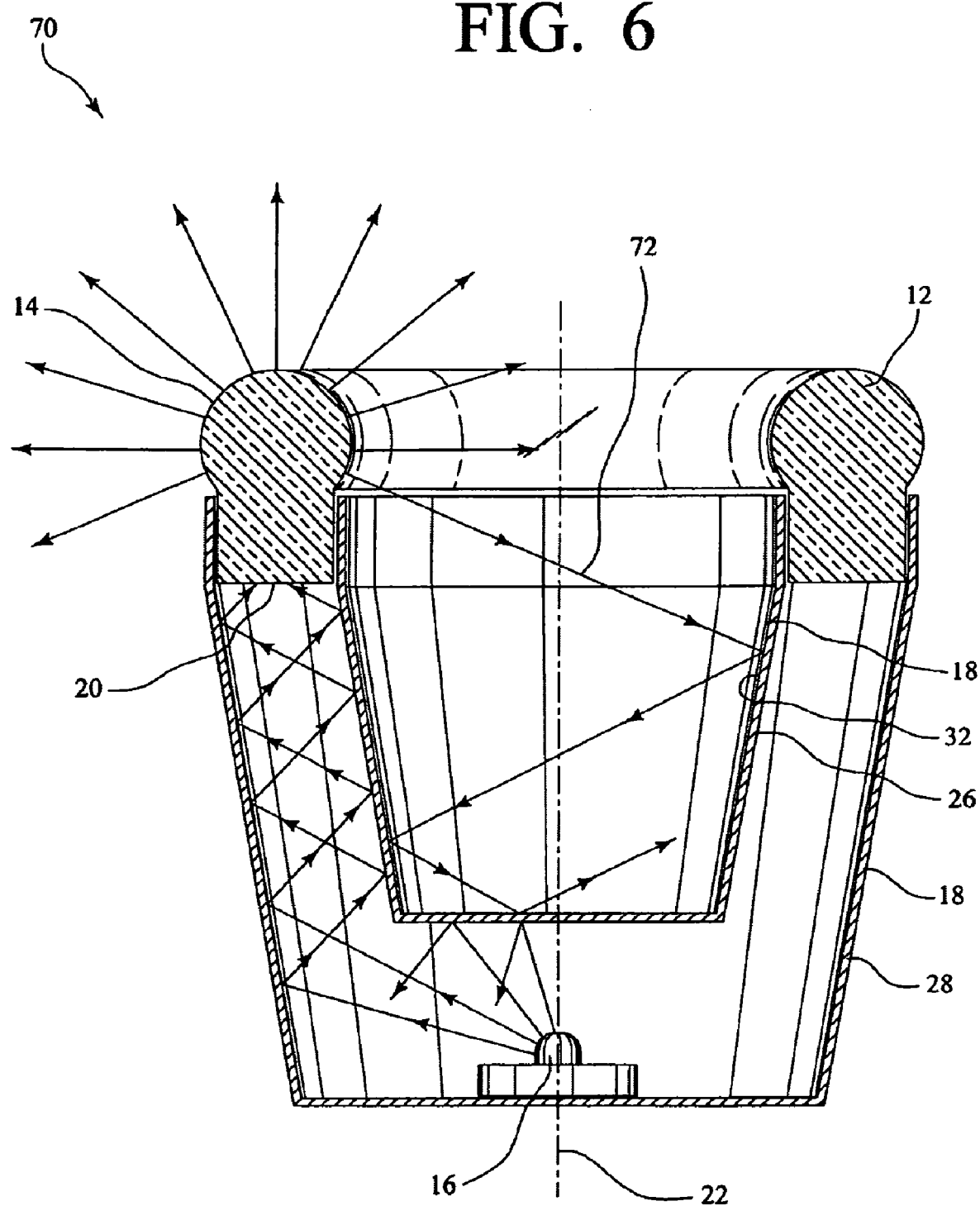
FIG. 6 is a side sectional view of still another alternate embodiment of an illumination device for simulating neon or similar lighting having a toroidal construction.

FIG. 6 shows a further embodiment 70 of an illumination device according to the invention. In this embodiment 70, the top reflector member 26 and bottom reflector member 28 are substantially cup-shaped, forming a light-directing housing 18 for directing light from the light source 16 to the light-receiving surface 20 of the light-transmitting member 12. Advantageously, the light-emitting surface 14 of the light-transmitting member 12 directs a portion of the emitted light (indicated in the figure by an exemplary light ray 72) into the interior of the cup-shaped top reflector member 26. The outer surface 32 of the top reflector member 26, which forms the interior of the "cup", may be substantially reflective to assist in evenly illuminating the interior of the cup-shaped top reflector member 26. Thus, the embodiment 70 could be used as an illuminated cup-holder, coin holder, or the like for use in an automobile or the like.

Figure 7:
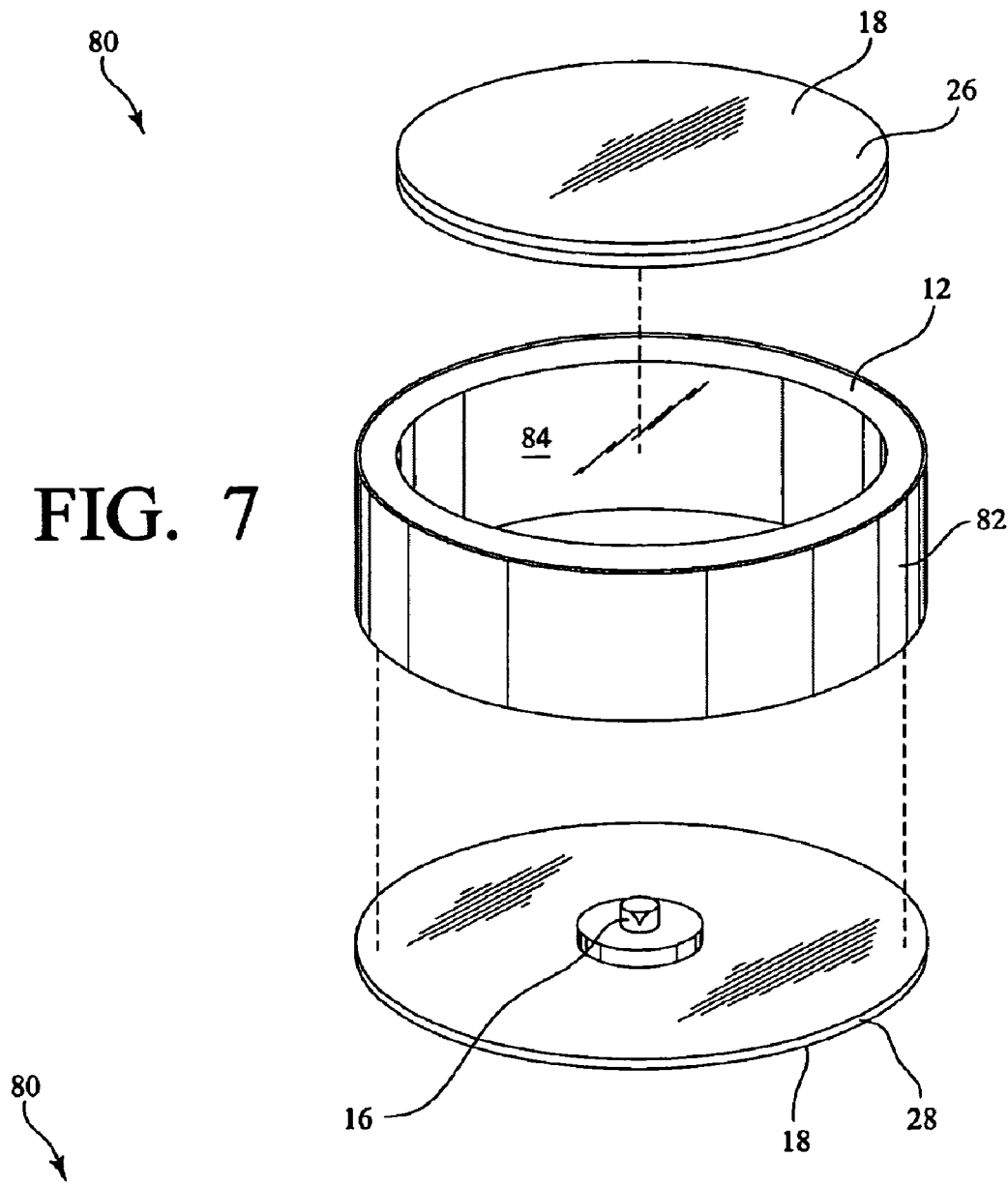
FIG. 7 is an exploded perspective view of another alternate embodiment of an illumination device for simulating neon or similar lighting having a toroidal construction.
Figure 8:
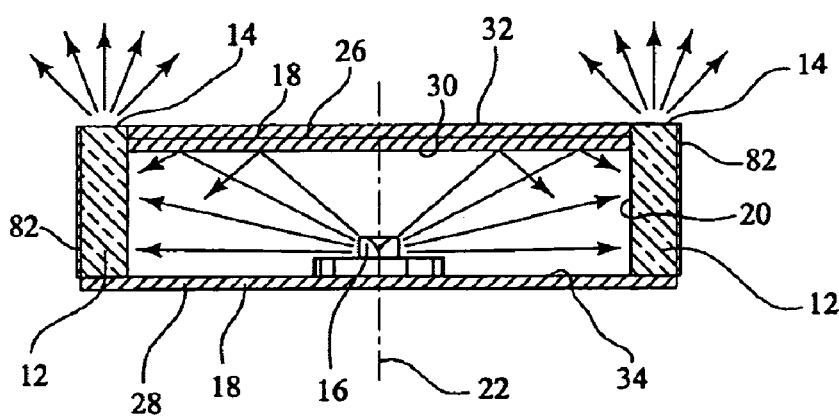
FIG. 8 is a side sectional view of the embodiment of FIG. 7.

FIG. 7 and FIG. 8 show yet another embodiment 80 of an illumination device according to the invention. FIG. 7 is an exploded perspective view showing a light-transmitting member 12, a light source 16, and a light-directing housing 18. The light-directing housing 18 has a top reflector member 26 and a bottom reflector member 28. The exemplary embodiment also include an outer reflector member 82. The outer reflector member 82 may be a reflective tape, a layer of reflective paint, or a metal ring.

FIG. 8 is a side sectional view of the embodiment 80 of FIG. 7, wherein it is demonstrated that light from the light source 16 (shown as a side-emitting LED) is directed into a light-receiving surface 20 of the light-transmitting member by a top reflector member 26 and a bottom reflector member 28. The bottom reflector member 28 and the outer reflector member 82 serve to limit the surface area of the light-transmitting member 12 that act as a light-emitting surface 14. However, in use, the light emitted has a substantially uniform intensity and brightness along the light-emitting surface 14 for simulating neon or similar lighting.

Figure 9:
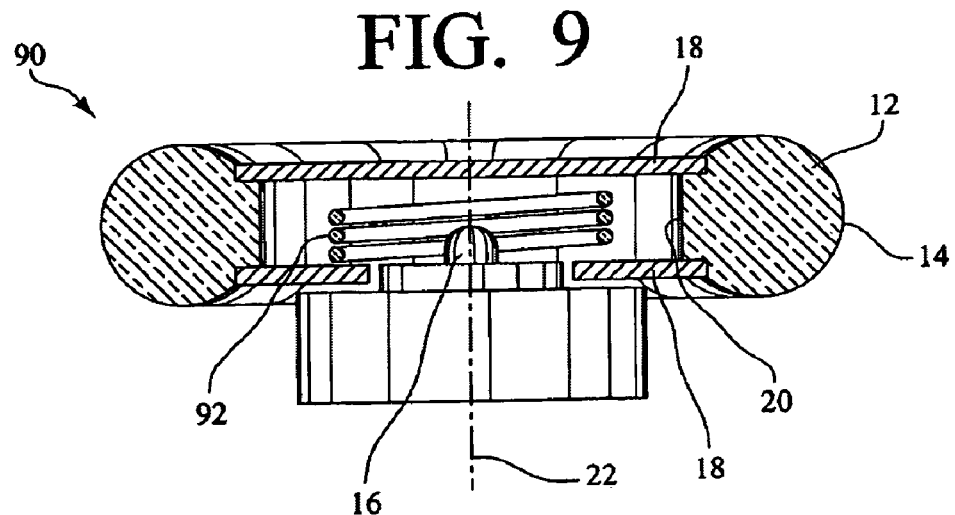
FIG. 9 is a side sectional view of another alternate embodiment of an illumination device for simulating neon or similar lighting having a toroidal construction.

FIG. 9 is a side sectional view of yet another embodiment 90 of the invention, having a light-transmitting member 12, a light source 16 and a light-directing housing 18. Additionally, the embodiment 90 has a helical filament 92 made of a light-transmitting material, containing a color-converting pigment, and positioned co-axially with the light source 16. The helical filament 92 serves as a color filter for altering the color of a portion of the light emitted by the light source 16 and received by the light-receiving surface 20 of the light-transmitting member 12. As mentioned earlier, the color-converting pigment may be a fluorescent or phosphorescent pigment.

Figure 10:
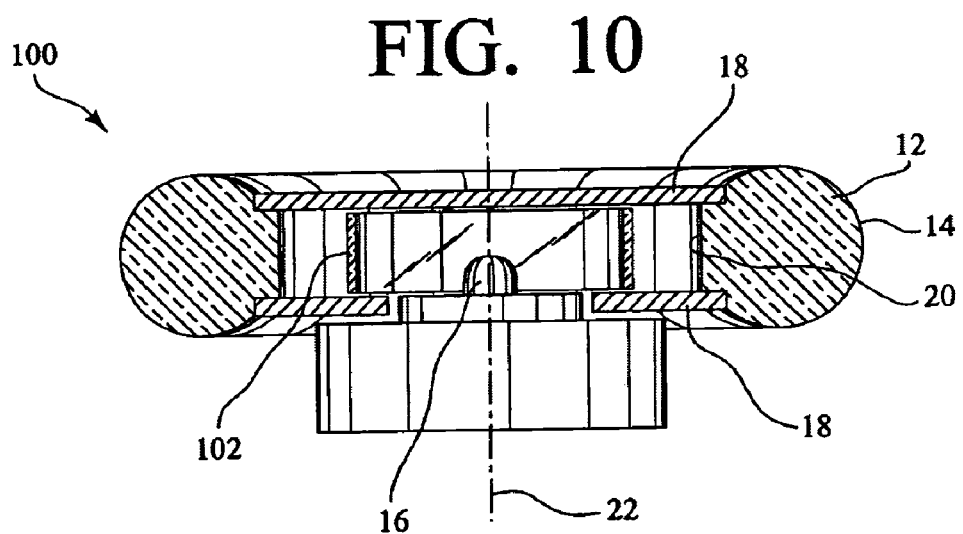
FIG. 10 is a side sectional view of another alternate embodiment of an illumination device for simulating neon or similar lighting having a toroidal construction.

FIG. 10 is a side sectional view of another embodiment 100 of the invention, having a light-transmitting member 12, a light source 16 and a light-directing housing 18. Additionally, the embodiment 100 has a cylindrical color-converting filter member 102. The cylindrical color-converting filter member 102 contains a color-converting pigment, such as a fluorescent or phosphorescent pigment, and serves to alter the color of the light emitted by the light source 16 and received by the light-receiving surface 20 of the light-transmitting member 12. It should be noted that a layer or coating of a color-converting paint applied to the light-receiving surface 20 of the light-transmitting member 12 would be a similar or equivalent structure to the color-converting filter member 102 shown and described.

Figure 11:
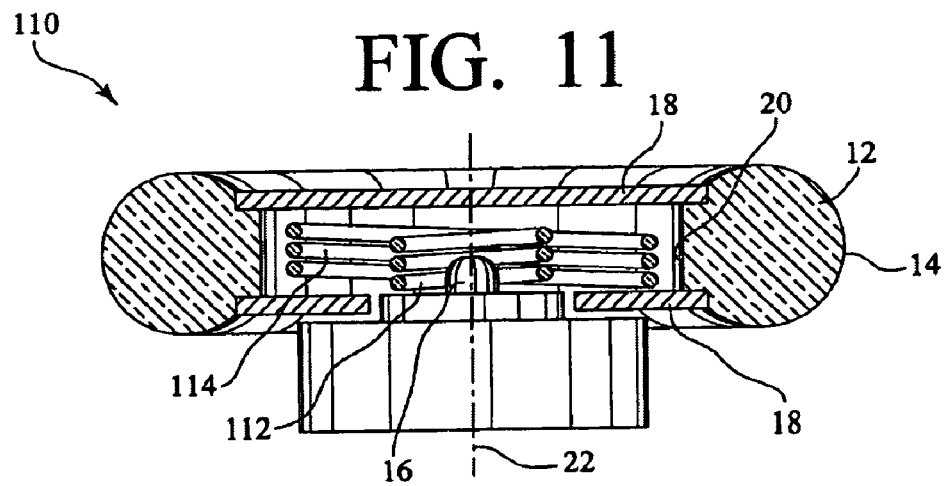
FIG. 11 is a side sectional view of yet another alternate embodiment of an illumination device for simulating neon or similar lighting having a toroidal construction.

Lastly, FIG. 11 is a side sectional view of another embodiment 110 of the invention, having a light-transmitting member 12, a light source 16 and a light-directing housing 18. The embodiment 110 also has a first helical filament 112 and a second helical filament 114. The overall diameter of the first helical filament 112 is smaller than the diameter of the second helical filament 114. The first helical filament 112 and the second helical filament 114 are positioned co-axially with the light source 16. Further, the first helical filament 112 and the second helical filament 114 are made of a light-transmitting material containing different color-converting pigments for altering the color of the light emitted by the light source 16. Thus, the first helical filament 112 and the second helical filament 114 can be used to alter the color of the light emitted along the light-emitting surface 14 of the light-transmitting member 12.

One of ordinary skill in the art will also recognize that additional embodiments are possible without departing from the teachings of the present invention or the scope of the claims which follow. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. An illumination device for simulating neon or similar lighting, comprising:
    a light-transmitting member formed in the shape of a toroid having a light-receiving surface and a light-emitting surface, said light-transmitting member defining a central axis and having optical waveguide and light-scattering characteristics;
    a light source located along said light-transmitting member central axis; and
    a light-directing housing for guiding light from said light source into said light-receiving surface of said light-transmitting member;
    whereby said light-transmitting member emits light having a substantially uniform intensity along said light-emitting surface.

2. The illumination device of claim 1, wherein said light-emitting surface of said light-transmitting member has a curved surface to aid in the simulated effect of neon or similar lighting.

3. The illumination device of claim 1, wherein said light-transmitting member is doped with a color-changing pigment to alter the color of light emitted at said light-emitting surface.

4. The illumination device of claim 1, wherein said light-directing housing has a top reflector member having a substantially reflective interior surface and a bottom reflector member having a substantially reflective interior surface, said top reflector member and said bottom reflector member being positioned on opposing sides of said light source and cooperating with said light-transmitting member such that light is emitted only through said light-transmitting member.

5. The illumination device of claim 4, wherein said top reflector member further has a substantially absorbing exterior surface.

6. The illumination device of claim 4, wherein said light source is located within the opening defined by the toroidal light-transmitting member.

7. The illumination device of claim 6, further having reflective tape positioned around a lower portion of said light-transmitting member.

8. The illumination device of claim 6, further having an outer reflector member having an inner substantially reflective surface, said outer reflector member positioned around an outer peripheral surface of said light-transmitting member, said bottom reflector member extending under a bottom peripheral surface of said light-transmitting member.

9. The illumination device of claim 4, wherein said light source is spaced a distance from the opening defined by the toroidal light-transmitting member.

10. The illumination device of claim 9, wherein said bottom reflector member has a cylindrical side wall and a disk-shaped bottom wall which meets said side wall along a lower edge of said side wall.

11. The illumination device of claim 9, wherein said top reflector member and said bottom reflector member have substantially conical shapes to direct light from the light source to the light-receiving surface of said light-transmitting member.

12. The illumination device of claim 9, wherein said top reflector member and said bottom reflector member are substantially cup-shaped such that said top reflector member has a cup-shaped recess, said light-emitting surface of said light-transmitting member illuminating at least a part of said cup-shaped recess.

13. The illumination device of claim 1, further comprising a first helical filament made of a light-transmitting material containing a color-converting pigment and positioned co-axially with said light source for altering the color of a portion of the light emitted by the light source.

14. The illumination device of claim 13, further comprising a second helical filament made of a light-transmitting material containing a color-converting pigment, said first helical filament having a smaller diameter than said second helical filament, said first helical filament and said second helical filament positioned co-axially with said light source for altering the color of the light emitted along the light-emitting surface of said light-transmitting member.

15. The illumination device of claim 1, further comprising a cylindrical color-converting filter member made of a light-transmitting material containing a color-converting pigment, said cylindrical color-converting filter member positioned co-axially with said light source for altering the color of light emitted by said light source and received by said light-receiving surface of said light-transmitting member.

* * * * *